E. MAKER.
COFFEE URN AND HEATED DISPENSING ATTACHMENT THEREFOR.
APPLICATION FILED DEC. 15, 1916.
1,237,357.
Patented Aug. 21, 1917.
2 SHEETS—SHEET 1.
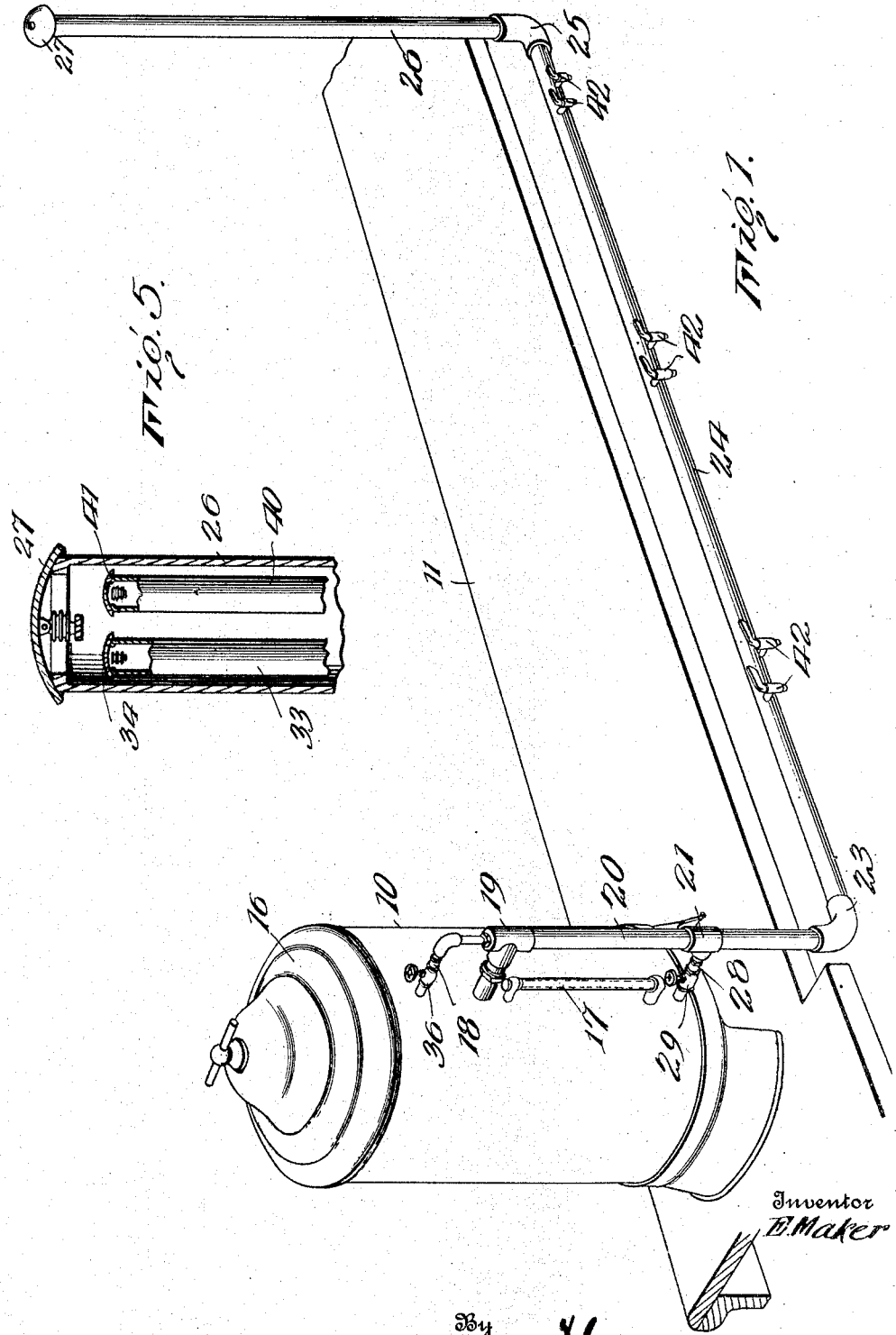
Inventor
E. Maker
By  Attorneys

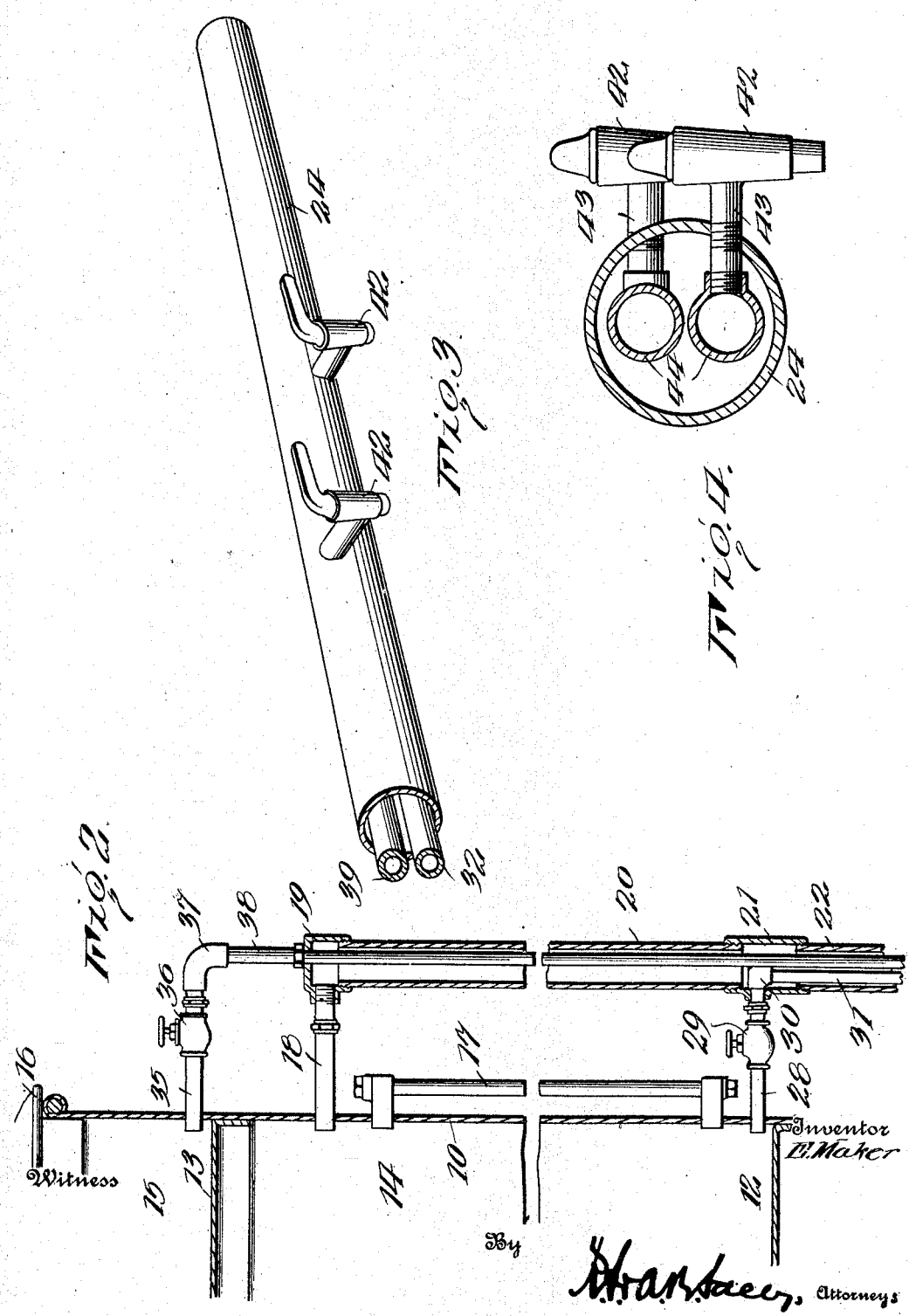

UNITED STATES PATENT OFFICE.

ERNEST MAKER, OF SANTA ROSA, CALIFORNIA.

COFFEE-URN AND HEATED DISPENSING ATTACHMENT THEREFOR.

1,237,357.  Specification of Letters Patent.  Patented Aug. 21, 1917.

Application filed December 15, 1916. Serial No. 137,225.

*To all whom it may concern:*

Be it known that I, ERNEST MAKER, a citizen of the United States, residing at Santa Rosa, in the county of Sonoma and State of California, have invented certain new and useful Improvements in Coffee-Urns and Heated Dispensing Attachments Therefor, of which the following is a specification.

This invention relates to an improved coffee urn and heated dispensing attachment therefor particularly designed for use in lunch rooms or other public places and has as its primary object to provide an arrangement wherein pipes will be led from the milk and coffee chambers of the urn along the counter of the lunch room and provided with faucets at suitably spaced points so that coffee and milk may be drawn from the urn at the said faucets without the necessity of each time making a trip to the coffee urn and wherein the coffee and milk pipes will be kept hot by the steam from the coffee chamber.

The invention has as a further object to provide an arrangement wherein the coffee and milk pipes will be inclosed within the steam pipe leading from the coffee chamber so that such steam will be utilized for the purpose above stated instead of being wasted by escaping into the air in the usual manner.

And the invention has as a still further object to provide an arrangement wherein coffee may be made within the urn in the usual manner and wherein the coffee and milk pipes as well as the steam pipe inclosing the said coffee and milk pipes will all be provided with valves to permit the escapement of any excess steam.

Other and incidental objects will appear as the description proceeds and in the drawings wherein I have illustrated the preferred embodiment of the invention and wherein similar reference characters designate corresponding parts throughout the several views:

Figure 1 is a perspective view showing the coffee urn upon a conventional type of counter with the dispensing attachment of the urn running along the counter, Fig. 2 is a fragmentary sectional view particularly showing the interior construction of the urn and the manner in which the steam pipe from the coffee chamber of the urn is connected therewith as well as the manner in which the coffee and milk dispensing pipes are respectively connected with the coffee and milk chambers of the urn, Fig. 3 is a fragmentary perspective view showing a portion of the horizontal reach of the steam pipe and the manner in which the coffee and milk dispensing pipes are arranged therein, Fig. 4 is a sectional view showing the manner in which the faucets of the coffee and milk dispensing pipes are connected thereto, and Fig. 5 is a fragmentary sectional view illustrating the valves at the free end of the steam pipe and the coffee and milk dispensing pipes.

In carrying out the invention, I employ a coffee urn 10 which may be arranged upon a suitable counter as conventionally illustrated at 11 in Fig. 1 of the drawings. The urn 10 is formed with a bottom wall 12 and an upper partition wall 13 defining a coffee chamber 14 between the walls 12 and 13 and a milk chamber 15 above the wall 13 at the upper extremity of the urn. Closing the urn is a removable cover 16 and communicating with the coffee chamber 14 at one side of the urn is a gage 17 of approved type.

Associated with the coffee chamber 14 of the urn 10 is a steam blow-off pipe therefor. This pipe includes a pipe section 18 leading from the chamber 14 adjacent its upper extremity and connected to an enlarged coupling 19. Depending from the said coupling is a pipe section 20 to the lower end of which is connected a coupling 21. Leading downwardly from the coupling 21 is a pipe section 22 to which is connected an elbow 23 arranged slightly below the counter 11 and extending horizontally beneath the counter from the said elbow is a pipe section 24. The horizontally arranged portion of the blow-off pipe may, of course, be of any suitable length to extend the desired distance longitudinally of the counter 11. The pipe section 24, at its end opposite the elbow 23, is provided with a similar elbow 25 and upstanding from the said elbow 25 is a pipe section 26 terminating at its upper end above the level of the coffee chamber 14 of the urn. Coffee within the said chamber cannot, therefore, flow out of the upper end of the blow-off pipe. Connected to the upper end of the pipe section 26 is a suitable spring pressed blow-off valve 27 normally closing the said blow-off pipe while, at the same time, steam from the coffee chamber 14 of the urn may readily flow through the said pipe.

Leading from the lower extremity of the coffee chamber 14 of the urn and arranged within the blow-off pipe is a coffee dispensing pipe including a pipe section 28 in which is arranged a suitable shut-off valve 29. The pipe section 28, at its outer extremity is fitted through the coupling 21 of the blow-off pipe and receives an elbow 30 to which is connected a depending pipe section 31 within the pipe section 22. From the pipe section 31, the coffee dispensing pipe is then continued through the pipe section 24 of the blow-off pipe as indicated at 32 and terminates in an upstanding pipe section 33 within the pipe section 26 of the blow-off pipe. The pipe section 33 of the coffee dispensing pipe is equipped, at its upper end, with a suitable spring pressed escapement valve 34 arranged immediately below the valve 27. In this connection, it is to be observed that the upper end of the coffee dispensing pipe is arranged above the upper extremity of the chamber 14 so that coffee cannot waste through the said pipe.

Leading from the lower extremity of the milk chamber 15 of the urn 10 and arranged within the steam blow-off pipe is a milk dispensing pipe including a pipe section 35 in which is interposed a shut-off valve 36. Connected to the outer extremity of the pipe section 35, is an elbow 37 to which is attached a pipe section 38 leading through the coupling 19 into the pipe section 20 of the blow-off pipe. From the pipe section 38, the milk dispensing pipe is then continued through the blow-off pipe as shown at 39 and terminates in an upstanding pipe section 40 within the upstanding pipe section 26 of the blow-off pipe. The pipe section 40 projects to a point above the upper extremity of the milk chamber 15 of the urn 10 and at its upper end is equipped with an escapement valve 41 similar to the valve 34 of the coffee dispensing pipe.

Connected to the horizontally arranged portion of the coffee and milk dispensing pipes at suitable longitudinally spaced points thereon, are pairs of dispensing faucets 42, the faucets of each pair being arranged adjacent each other and communicating with the said pipes respectively. Leading from the faucets 42, are branch pipes 43 threaded through the horizontally arranged pipe section 24 of the steam blow-off pipe and connected at their inner extremities with couplings 44 interposed in the coffee and milk dispensing pipes. Any suitable number of pairs of the faucets 42 may, of course, be employed depending upon the length of the horizontally arranged portions of the coffee and milk dispensing pipes and the blow-off pipe.

As will now be clear, the valves 29 and 36 may be closed, when coffee may be made within the coffee chamber 14 of the urn 10 in the usual manner with the heat from the lower portion of the urn rising to heat the milk within the milk chamber 15. At the same time, steam from the coffee chamber 14 may pass through the blow-off pipe to escape at the valve 27. This steam in thus flowing through the blow-off pipe will, of course, heat the coffee and milk dispensing pipes arranged therein and after such pipes have become so heated, the valves 29 and 36 may be opened when the coffee and milk will enter the coffee and milk dispensing pipes to be kept heated by the steam from the coffee chamber. Consequently, the coffee and milk may at any time be dispensed at the faucets 42 without the necessity of the attendant making a trip to the coffee urn each time it is desired to pour a cup of coffee. The advantage of this arrangement will at once be obvious and especially in large lunch rooms or other public places where a long counter is employed. Furthermore, the coffee and milk within the dispensing pipes therefor will, at all times, be kept hot by utilizing the escaping steam from the coffee chamber for this purpose while any steam rising from the coffee and milk within the dispensing pipes therefor will be permitted to escape from the valves 34 and 41 upon the upper ends of the coffee and milk dispensing pipes.

Having thus described the invention, what is claimed as new is:

1. A device of the character described including a heating urn provided with spaced chambers, a steam blow-off pipe leading from one of said chambers, and dispensing pipes leading from both of the said chambers and arranged within said blow off pipe.

2. A device of the character described including a coffee heating urn provided with a coffee chamber and a milk chamber, a steam blow-off pipe leading from the coffee chamber, coffee and milk dispensing pipes leading from the coffee and milk chambers respectively and arranged within the blow-off pipe, and dispensing faucets connected with the said coffee and milk dispensing pipes respectively.

3. A device of the character described including a coffee heating urn provided with a coffee chamber and a milk chamber, a steam blow-off pipe leading from the coffee chamber and provided with a horizontally arranged portion extending away from the urn, coffee and milk dispensing pipes leading from the coffee and milk chambers respectively and arranged within the said blow off pipe, and dispensing faucets projecting from the horizontally arranged portion of the blow-off pipe and respectively connected with the coffee and milk dispensing pipes.

4. A device of the character described including a coffee heating urn provided with a coffee chamber and a milk chamber, a steam blow-off pipe leading from the coffee chamber and provided at its outer extremity with an escapement valve, coffee and milk dispensing pipes leading from the said chambers and arranged within the said blow-off pipe, steam escapement valves closing the outer open ends of the said dispensing pipes, and dispensing faucets connected with the said coffee and milk dispensing pipes respectively and projecting from the blow-off pipe.

5. The combination with a coffee heating urn provided with a coffee chamber and a milk chamber, of a steam blow-off pipe leading from the coffee chamber and extending laterally with respect to the urn, coffee and milk dispensing pipes leading from the said coffee and milk chambers respectively and arranged within the said blow-off pipe, and dispensing faucets respectively connected with the said coffee and milk dispensing pipes.

6. The combination in a device of the character described, of a drink heating urn provided with spaced chambers with the urn adapted to have heat applied to one of the said chambers for heating both of the chambers, a steam blow off pipe leading from one of the chambers, and dispensing pipes leading from both of the chambers and carried through the said blow off pipe.

In testimony whereof I affix my signature.

ERNEST MAKER. [L. S.]

Copies of this patent may be obtained for five cents each, by addressing the "Commissioner of Patents, Washington, D. C."